United States Patent
Song et al.

(10) Patent No.: US 11,228,534 B2
(45) Date of Patent: Jan. 18, 2022

(54) CONGESTION CONTROL METHOD, NETWORK DEVICE, AND NETWORK INTERFACE CONTROLLER

(71) Applicant: HUAWEI TECHNOLOGIES CO., LTD., Guangdong (CN)

(72) Inventors: Haoyu Song, Santa Clara, CA (US); Zhigang Ji, Beijing (CN); Yali Zhang, Beijing (CN); Yinben Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/683,730

(22) Filed: Nov. 14, 2019

(65) Prior Publication Data
US 2020/0084155 A1 Mar. 12, 2020

Related U.S. Application Data

(63) Continuation of application No. PCT/CN2018/084819, filed on Apr. 27, 2018.

(30) Foreign Application Priority Data

May 15, 2017 (CN) .......................... 201710340116.3

(51) Int. Cl.
*H04L 12/807* (2013.01)
*H04L 12/833* (2013.01)
*H04L 12/861* (2013.01)

(52) U.S. Cl.
CPC .............. *H04L 47/27* (2013.01); *H04L 47/31* (2013.01); *H04L 49/9068* (2013.01)

(58) Field of Classification Search
CPC ....... H04L 47/27; H04L 47/31; H04L 47/193; H04L 4149/9068
See application file for complete search history.

(56) References Cited

U.S. PATENT DOCUMENTS 7,047,312 B1 * 5/2006 Aweya .................. H04L 1/1832
370/231
7,283,474 B1 * 10/2007 Bergenwall ............. H04L 69/04
370/235

(Continued)

FOREIGN PATENT DOCUMENTS

CN 105897606 A 8/2016
CN 106027412 A * 10/2016

(Continued)

OTHER PUBLICATIONS

Mohammad Alizadeh et al., "Data Center TCP (DCTCP)", ACM SIGCOMM 2010, dated Aug. 30-Sep. 3, 2010, total 12 pages.

(Continued)

*Primary Examiner* — Saumit Shah

(57) ABSTRACT

This application provides a congestion control method, a network device, and a network interface controller. In the congestion control method performed by a first intermediate device, the first intermediate device receives a first data packet sent by a sending device, sends the first data packet to a receiving device along a first path, receives a first acknowledgment packet that is sent by the receiving device and that is used for acknowledging the first data packet, and determines a congestion degree of the first path based on a congestion mark in the first acknowledgment packet. The first intermediate device changes a window value and sends the changed first acknowledgment packet to the sending device. According to a solution provided in this application, a speed of transmitting a data packet is adjusted based on a congestion degree of a communication path and a quantity of bytes of the data packet.

20 Claims, 5 Drawing Sheets

(56) References Cited

U.S. PATENT DOCUMENTS

| | | | |
|---|---|---|---|
| 7,352,700 B2* | 4/2008 | Chan | H04L 47/30 370/235 |
| 8,948,009 B1* | 2/2015 | Hasan | H04L 47/127 370/231 |
| 2007/0070892 A1* | 3/2007 | Lee | H04L 29/06027 370/229 |
| 2011/0110230 A1* | 5/2011 | Zhuang | H04L 43/16 370/230 |
| 2016/0323194 A1 | 11/2016 | Lee | |
| 2017/0310601 A1* | 10/2017 | Yu | H04L 43/0817 |

FOREIGN PATENT DOCUMENTS

| | | |
|---|---|---|
| CN | 106027412 A | 10/2016 |
| CN | 106533970 A | 3/2017 |
| WO | 01/97446 A2 | 12/2001 |
| WO | 2006079845 A1 | 8/2006 |

OTHER PUBLICATIONS

Keqiang He et al., "AC/DC TCP: Virtual Congestion Control Enforcement for Datacenter Networks", ACM SIGCOMM 2016, dated Aug. 22-26, 2016, total 14 pages.

Mohammad Alizadeh et al., "CONGA: Distributed Congestion-Aware Load Balancing for Datacenters", ACM SIGCOMM 2014, dated Aug. 17-22, 2014, total 12 pages.

Haoyu Song et al., "3D Fabric: Differential Deceleration and Detour for Congestion Free Data Center Networks", dated Aug. 22-24, 2017, pp. 82-84.

International Search Report for PCT/CN2018/084819 dated Jul. 18, 2018, 4 pages.

Ziegler et al.: "Congestion avoidance with BUC (buffer utilization control) gateways and RFCN (reverse feedback congestion notification)," Feb. 5, 1997 (Feb. 5, 1997), pp. 410-418, XP010217018, 9 pages.

\* cited by examiner

CONGESTION CONTROL METHOD, NETWORK DEVICE, AND NETWORK INTERFACE CONTROLLER

CROSS-REFERENCE TO RELATED APPLICATIONS

This application is a continuation of International Application No. PCT/CN2018/084819, filed on Apr. 27, 2018, which claims priority to Chinese Patent Application No. 201710340116.3, filed on May 15, 2017. The disclosures of the aforementioned applications are hereby incorporated by reference in their entireties.

TECHNICAL FIELD

This application relates to the communications field, and in particular, to a congestion control method, a network device, and a network interface controller.

BACKGROUND

In a current data center, a data center transmission control protocol (DCTCP) and an explicit congestion notification (ECN) are used to perform congestion control. In a data transmission process, a data packet sent by a sending device includes a congestion field. An intermediate network device determines, based on a current length of a queue of the device, whether to set a congestion mark in the congestion field. A receiving device adds congestion mark information to an acknowledgment (ACK) packet and returns the acknowledgment packet to the sending device. The sending device may determine, based on the congestion mark information in the acknowledgment packet, whether congestion occurs during data packet sending, and adjust a sending rate (for example, when congestion occurs, reducing a transmit window size). Congestion control used in the foregoing data transmission process is relatively simple, but more accurate and effective congestion control cannot be provided.

SUMMARY

This application provides a congestion control method, a network device, and a network interface controller, to provide more accurate and effective congestion control and improve network resource utilization.

According to a first aspect, a congestion control method is provided. The method is applied to a data transmission network. The data transmission network includes a sending device, at least one intermediate device, and a receiving device. The sending device sends a data packet to the receiving device by using the intermediate device. The method includes:

receiving, by a first intermediate device in the at least one intermediate device, a first data packet sent by the sending device, and sending the first data packet to the receiving device along a first path;

receiving, by the first intermediate device, a first acknowledgment packet that is sent by the receiving device and that is used for acknowledging the first data packet, and determining a congestion degree of the first path based on a congestion mark in the first acknowledgment packet; and changing, by the first intermediate device, a window value of the first acknowledgment packet based on the congestion degree of the first path and a quantity of bytes of a data packet having a first identifier in the first data packet, and sending the changed first acknowledgment packet to the sending device, where the window value is used to notify the sending device of a quantity of bytes that can be received by the receiving device, and the first identifier includes a source IP address, a source port, a destination IP address, and a destination port.

In the foregoing embodiment (and as a non-limiting example solution to the technical problem presented herein), the first intermediate device changes a window value of an acknowledgment packet returned to the sending device, so that the sending device can adjust a sending rate based on the window value of the acknowledgment packet. The window value is differently changed based on a path congestion degree and a quantity of bytes of a data packet, thereby implementing more accurate and effective congestion control and improving network resource utilization.

Optionally, changing a window value of the first acknowledgment packet can include: if the congestion degree of the first path is "slight", and the quantity of bytes of the data packet having the first identifier in the first data packet is greater than a specified threshold (in other words, the data packet having the first identifier belongs to an elephant flow (e.g., a large flow)), reducing, by the first intermediate device, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. In this way, when the congestion degree of the path is "slight", a rate of the elephant flow is reduced, and a rate of a mice flow (e.g., a short flow) is ensured.

Optionally, changing a window value of the first acknowledgment packet includes: if the congestion degree of the first path is "heavy", and there is no slightly congested or non-congested path from the first intermediate device to the receiving device (in other words, there is no other path from the first intermediate device to the receiving device, or congestion degrees of all paths from the first intermediate device to the receiving device are "heavy"), reducing, by the first intermediate device, window values of all acknowledgment packets in the first acknowledgment packet. In this way, when there is no switchable path, the sending device reduces sending rates of all data packets (including the elephant flow and the mice flow) on the first path.

Optionally, changing a window value of the first acknowledgment packet includes: if the congestion degree of the first path is "heavy", the quantity of bytes of the data packet having the first identifier in the first data packet is greater than the specified threshold (in other words, the data packet having the first identifier belongs to an elephant flow), and there is a slightly congested or non-congested second path from the first intermediate device to the receiving device (in other words, there is a switchable path), setting, by the first intermediate device, the window value of the acknowledgment packet having a second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The method further includes: after the timer expires, sending, by the first intermediate device to the receiving device along the second path, a data packet having the first identifier in a second data packet received from the sending device. A window value of an acknowledgment packet is set to 0, to create a path switching occasion. The timer is set, so that there is time for a packet that is being transmitted on a path to arrive at the receiving device, thereby reducing a possibility of packet disorder caused by path switching.

Optionally, if the first intermediate device receives, before the timer expires, a second acknowledgment packet sent by the receiving device, and the second acknowledgment packet indicates that all data packets having the first identifier in the first data packet are received by the receiving device, the first intermediate device sends, to the receiving device along the second path, a data packet having the first identifier in a third data packet received from the sending device. If all data packets sent by the sending device to the receiving device arrive at the receiving device before the timer expires (in this case, path switching does not cause packet disorder), the first intermediate device directly performs path switching processing, thereby reducing a waiting time.

According to a second aspect, a congestion control method is provided. The method can be applied to a data transmission network. The data transmission network includes a sending device, at least one intermediate device, and a receiving device. The sending device includes a processor and a network interface controller (NIC). The sending device sends a data packet to the receiving device by using the intermediate device. The method further includes:

receiving, by the NIC, a first data packet sent by the processor, and sending the first data packet to the receiving device along a first path;

receiving, by the NIC, a first acknowledgment packet that is sent by the receiving device and that is used for acknowledging the first data packet, and determining a congestion degree of the first path based on a congestion mark in the first acknowledgment packet; and changing, by the NIC, a window value of the first acknowledgment packet based on the congestion degree of the first path and a quantity of bytes of a data packet having a first identifier in the first data packet, and sending the changed first acknowledgment packet to the processor, where the window value is used to notify the processor of a quantity of bytes that can be received by the receiving device, and the first identifier includes a source IP address, a source port, a destination IP address, and a destination port.

In the foregoing solution, the NIC changes a window value of an acknowledgment packet returned to the processor, so that the processor may adjust a sending rate based on the window value of the acknowledgment packet. The window value is differently changed based on a path congestion degree and a quantity of bytes of a data packet, thereby implementing more accurate and effective congestion control.

Optionally, changing a window value of the first acknowledgment packet includes: if the congestion degree of the first path is "slight", and the quantity of bytes of the data packet having the first identifier in the first data packet is greater than a specified threshold, reducing, by the NIC, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier.

Optionally, changing a window value of the first acknowledgment packet includes: if the congestion degree of the first path is "heavy", and there is no slightly congested or non-congested path from the NIC to the receiving device, reducing, by the NIC, window values of all acknowledgment packets in the first acknowledgment packet.

Optionally, changing a window value of the first acknowledgment packet includes: if the congestion degree of the first path is "heavy", the quantity of bytes of the data packet having the first identifier in the first data packet is greater than the specified threshold, and there is a slightly congested or non-congested second path from the NIC to the receiving device, setting, by the NIC, the window value of the acknowledgment packet having the second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The method can further include: after the timer expires, sending, by the NIC to the receiving device along the second path, a data packet having the first identifier in a second data packet received from the processor.

Optionally, if the NIC receives, before the timer expires, a second acknowledgment packet sent by the receiving device, and the second acknowledgment packet indicates that all data packets having the first identifier in the first data packet are received by the receiving device, the NIC sends, to the receiving device along the second path, a data packet having the first identifier in a third data packet received from the processor.

According to a third aspect, a network device is provided. The network device is applied to a data transmission network. The data transmission network includes a sending device, at least one intermediate device, and a receiving device. The network device is a first intermediate device in the at least one intermediate device. The sending device sends a data packet to the receiving device by using the intermediate device. The network device includes a receiving unit, a sending unit, and a processing unit.

The receiving unit is configured to receive a first data packet sent by the sending device, and is further configured to receive a first acknowledgment packet that is sent by the receiving device and that is used for acknowledging the first data packet.

The sending unit is configured to send the first data packet to the receiving device along a first path.

The processing unit is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port.

The sending unit is further configured to send the changed first acknowledgment packet to the sending device. The window value is used to notify the sending device of a quantity of bytes that can be received by the receiving device.

Optionally, the changing a window value of the first acknowledgment packet includes: if the congestion degree of the first path is "slight", and the quantity of bytes of the data packet having the first identifier in the first data packet is greater than a specified threshold, reducing, by the processing unit, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier.

Optionally, the changing a window value of the first acknowledgment packet includes: if the congestion degree of the first path is "heavy", and there is no slightly congested or non-congested path from the network device to the receiving device, reducing, by the processing unit, window values of all acknowledgment packets in the first acknowledgment packet.

Optionally, the changing a window value of the first acknowledgment packet includes: if the congestion degree of the first path is "heavy", the quantity of bytes of the data packet having the first identifier in the first data packet is greater than the specified threshold, and there is a slightly congested or non-congested second path from the network device to the receiving device, setting, by the processing unit, the window value of the acknowledgment packet having the second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The sending unit is further configured to: after the timer expires, send, to the receiving device along the second path, a data packet having the first identifier in a second data packet received by the receiving unit from the sending device.

Optionally, the sending unit is further configured to: if the receiving unit receives, before the timer expires, a second acknowledgment packet sent by the receiving device, and the second acknowledgment packet indicates that all data packets having the first identifier in the first data packet are received by the receiving device, send, to the receiving device along the second path, a data packet having the first identifier in a third data packet received by the receiving unit from the sending device.

According to a fourth aspect, a network interface controller NIC is provided. The NIC is applied to a data transmission network. The data transmission network includes a sending device, at least one intermediate device, and a receiving device. The sending device includes a processor and the NIC. The sending device sends a data packet to the receiving device by using the intermediate device. The NIC includes a receiving unit, a sending unit, and a processing unit.

The receiving unit is configured to receive a first data packet sent by the processor, and is further configured to receive a first acknowledgment packet that is sent by the receiving device and that is used for acknowledging the first data packet.

The sending unit is configured to send the first data packet to the receiving device along a first path.

The processing unit is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port.

The sending unit is further configured to send the changed first acknowledgment packet to the processor. The window value is used to notify the processor of a quantity of bytes that can be received by the receiving device.

Optionally, changing a window value of the first acknowledgment packet includes: if the congestion degree of the first path is "slight", and the quantity of bytes of the data packet having the first identifier in the first data packet is greater than a specified threshold, reducing, by the processing unit, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier.

Optionally, changing a window value of the first acknowledgment packet includes: if the congestion degree of the first path is "heavy", and there is no slightly congested or non-congested path from the NIC to the receiving device, reducing, by the processing unit, window values of all acknowledgment packets in the first acknowledgment packet.

Optionally, changing a window value of the first acknowledgment packet includes: if the congestion degree of the first path is "heavy", the quantity of bytes of the data packet having the first identifier in the first data packet is greater than the specified threshold, and there is a slightly congested or non-congested second path from the NIC to the receiving device, setting, by the processing unit, the window value of the acknowledgment packet having the second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The sending unit is further configured to: after the timer expires, send, to the receiving device along the second path, a data packet having the first identifier in a second data packet received by the receiving unit from the processor.

Optionally, the sending unit is further configured to: if the receiving unit receives, before the timer expires, a second acknowledgment packet sent by the receiving device, and the second acknowledgment packet indicates that all data packets having the first identifier in the first data packet are received by the receiving device, send, to the receiving device along the second path, a data packet having the first identifier in a third data packet received by the receiving unit from the processor.

According to a fifth aspect, a network device is provided. The network device is applied to a data transmission network. The data transmission network includes a sending device, at least one intermediate device, and a receiving device. The network device is a first intermediate device in the at least one intermediate device. The sending device sends a data packet to the receiving device by using the intermediate device. The network device includes a receiver, a transmitter, and a processor.

The receiver is configured to receive a first data packet sent by the sending device, and is further configured to receive a first acknowledgment packet that is sent by the receiving device and that is used for acknowledging the first data packet.

The transmitter is configured to send the first data packet to the receiving device along a first path.

The processor is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port.

The transmitter is further configured to send the changed first acknowledgment packet to the sending device. The window value is used to notify the sending device of a quantity of bytes that can be received by the receiving device.

Optionally, changing a window value of the first acknowledgment packet includes: if the congestion degree of the first path is "slight", and the quantity of bytes of the data packet having the first identifier in the first data packet is greater than a specified threshold, reducing, by the processor, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier.

Optionally, changing a window value of the first acknowledgment packet includes: if the congestion degree of the first path is "heavy", and there is no slightly congested or non-congested path from the network device to the receiving device, reducing, by the processor, window values of all acknowledgment packets in the first acknowledgment packet.

Optionally, changing a window value of the first acknowledgment packet includes: if the congestion degree of the first path is "heavy", the quantity of bytes of the data packet having the first identifier in the first data packet is greater than the specified threshold, and there is a slightly congested or non-congested second path from the network device to the receiving device, setting, by the processor, the window value of the acknowledgment packet having the second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The transmitter is further configured to: after the timer expires, send, to the receiving device along the second path, a data packet having the first identifier in a second data packet received by the receiver from the sending device.

Optionally, the transmitter is further configured to: if the receiver receives, before the timer expires, a second acknowledgment packet sent by the receiving device, and the second acknowledgment packet indicates that all data packets having the first identifier in the first data packet are received by the receiving device, send, to the receiving device along the second path, a data packet having the first identifier in a third data packet received by the receiver from the sending device.

According to a sixth aspect, a NIC is provided. The NIC is applied to a data transmission network. The data transmission network includes a sending device, at least one intermediate device, and a receiving device. The sending device includes a first processor and the NIC. The sending device sends a data packet to the receiving device by using the intermediate device. The NIC includes a receiver, a transmitter, and a second processor.

The receiver is configured to receive a first data packet sent by the first processor, and is further configured to receive a first acknowledgment packet that is sent by the receiving device and that is used for acknowledging the first data packet.

The transmitter is configured to send the first data packet to the receiving device along a first path.

The second processor is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port.

The transmitter is further configured to send the changed first acknowledgment packet to the first processor. The window value is used to notify the first processor of a quantity of bytes that can be received by the receiving device.

Optionally, changing a window value of the first acknowledgment packet includes: if the congestion degree of the first path is "slight", and the quantity of bytes of the data packet having the first identifier in the first data packet is greater than a specified threshold, reducing, by the second processor, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier.

Optionally, changing a window value of the first acknowledgment packet includes: if the congestion degree of the first path is "heavy", and there is no slightly congested or non-congested path from the NIC to the receiving device, reducing, by the second processor, window values of all acknowledgment packets in the first acknowledgment packet.

Optionally, changing a window value of the first acknowledgment packet includes: if the congestion degree of the first path is "heavy", the quantity of bytes of the data packet having the first identifier in the first data packet is greater than the specified threshold, and there is a slightly congested or non-congested second path from the NIC to the receiving device, setting, by the second processor, the window value of the acknowledgment packet having the second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The transmitter is further configured to: after the timer expires, send, to the receiving device along the second path, a data packet having the first identifier in a second data packet received by the receiver from the first processor.

Optionally, the transmitter is further configured to: if the receiver receives, before the timer expires, a second acknowledgment packet sent by the receiving device, and the second acknowledgment packet indicates that all data packets having the first identifier in the first data packet are received by the receiving device, send, to the receiving device along the second path, a data packet having the first identifier in a third data packet received by the receiver from the first processor.

According to a seventh aspect, a network device is provided. The network device is applied to a data transmission network. The data transmission network includes a sending device, at least one intermediate device, and a receiving device. The network device is the sending device. The sending device sends a data packet to the receiving device by using the intermediate device. The sending device includes a processor and a NIC.

The processor is configured to send a first data packet to the NIC.

The NIC is configured to receive the first data packet sent by the processor, and send the first data packet to the receiving device along a first path; and is further configured to: receive a first acknowledgment packet that is sent by the receiving device and that is used for acknowledging the first data packet; determine a congestion degree of the first path based on a congestion mark in the first acknowledgment packet; change a window value of the first acknowledgment packet based on the congestion degree of the first path and a quantity of bytes of a data packet having a first identifier in the first data packet; and send the changed first acknowledgment packet to the processor. The window value is used to notify the processor of a quantity of bytes that can be received by the receiving device. The first identifier includes a source IP address, a source port, a destination IP address, and a destination port.

The processor is further configured to: receive the changed first acknowledgment packet sent by the NIC, and send a second data packet to the receiving device based on the changed first acknowledgment packet by using the NIC.

Optionally, changing a window value of the first acknowledgment packet includes: if the congestion degree of the first path is "slight", and the quantity of bytes of the data packet having the first identifier in the first data packet is greater than a specified threshold, reducing, by the NIC, a window value of an acknowledgment packet having a second identifier in the first acknowledgment packet. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier.

Optionally, changing a window value of the first acknowledgment packet includes: if the congestion degree of the first path is "heavy", and there is no slightly congested or non-congested path from the NIC to the receiving device, reducing, by the NIC, window values of all acknowledgment packets in the first acknowledgment packet.

Optionally, changing a window value of the first acknowledgment packet includes: if the congestion degree of the first path is "heavy", the quantity of bytes of the data packet having the first identifier in the first data packet is greater than the specified threshold, and there is a slightly congested or non-congested second path from the NIC to the receiving device, setting, by the NIC, the window value of the acknowledgment packet having the second identifier in the first acknowledgment packet to 0, and starting a timer. The second identifier includes a source IP address, a source port, a destination IP address, and a destination port. The source IP address, the source port, the destination IP address, and the destination port in the first identifier are respectively the same as the destination IP address, the destination port, the source IP address, and the source port in the second identifier. The NIC is further configured to: after the timer expires, send, to the receiving device along the second path, a data packet having the first identifier in the second data packet received by the NIC from the processor.

Optionally, the NIC is further configured to: if the NIC receives, before the timer expires, a second acknowledgment packet sent by the receiving device, and the second acknowledgment packet indicates that all data packets having the first identifier in the first data packet are received by the receiving device, send, to the receiving device along the second path, a data packet having the first identifier in a third data packet received by the NIC from the processor.

According to an eighth aspect, a computer readable storage medium is provided. The computer readable storage medium stores an instruction. When run on a computer, the instruction enables the computer to perform the methods according to the foregoing aspects.

According to a ninth aspect, a computer program product including one or more instructions is provided. When run on a computer, the one or more instructions enable the computer to perform the methods according to the foregoing aspects.

DESCRIPTION OF EMBODIMENTS

To make the objectives, technical solutions, and advantages of the present technology clearer, the following further describes the embodiments of the present technology in detail with reference to the accompanying drawings.

An application scenario described in the embodiments of this application is intended to more clearly describe the technical solutions of the embodiments of this application, and does not constitute a limitation on the technical solutions provided in the embodiments of this application. A person of ordinary skill in the art may learn that the technical solutions provided in the embodiments of this application are also applicable to a similar technical problem as network architectures evolve and new application scenarios emerge.

Figure 1:
FIG. 1 is a schematic structural diagram of a network according to an embodiment of this application.

FIG. 1 is a schematic structural diagram of a network according to an embodiment of this application. The network includes a sending device 101, at least one intermediate device (for example, intermediate devices 102, 103, 104, 105, 107, and 108 in FIG. 1), and a receiving device 106. The sending device 101 sends a data packet to the receiving device 106 by using the intermediate device. The sending device 101 may establish a transmission control protocol TCP) connection to the receiving device 106. All data packets sent by the sending device 101 arrive at the intermediate device 102, and then may arrive at the receiving device 106 along a first path. The intermediate device 102 may be a first-hop network device or an $N^{th}$-hop network device at which the data packets sent by the sending device 101 to the receiving device 106 arrive, where N is an integer greater than 1. The first path may include no intermediate device, or one or more intermediate devices (for example, the intermediate devices 103, 104, and 105 as shown in FIG. 1). An acknowledgment packet (for example, an ACK packet) that is sent by the receiving device 106 and that is used for acknowledging the data packet sent by the sending device 101 may arrive at the intermediate device 102 along the first path, and then is sent by the intermediate device 102 to the sending device 101. Alternatively, the acknowledgment packet may arrive at the intermediate device 102 along a second path different from the first path, and then is sent by the intermediate device 102 to the sending device 101. The second path may include no intermediate device, or one or more intermediate devices (for example, the intermediate devices 105, 108, and 107 in FIG. 1). Each acknowledgment packet used for acknowledging the data packet sent by the sending device 101 arrives at the sending device 101 by using the intermediate device 102. For example, when a network structure in FIG. 1 is applied to a data center, the sending device 101 may be a host or a server, the receiving device 106 may be a host or a server, and the intermediate device may be a switch, a router, a virtual switch, or the like. Alternatively, the intermediate device 102 may be a top of rack (TOR) switch, and the intermediate device 105 may also be a TOR switch.

Figure 2:
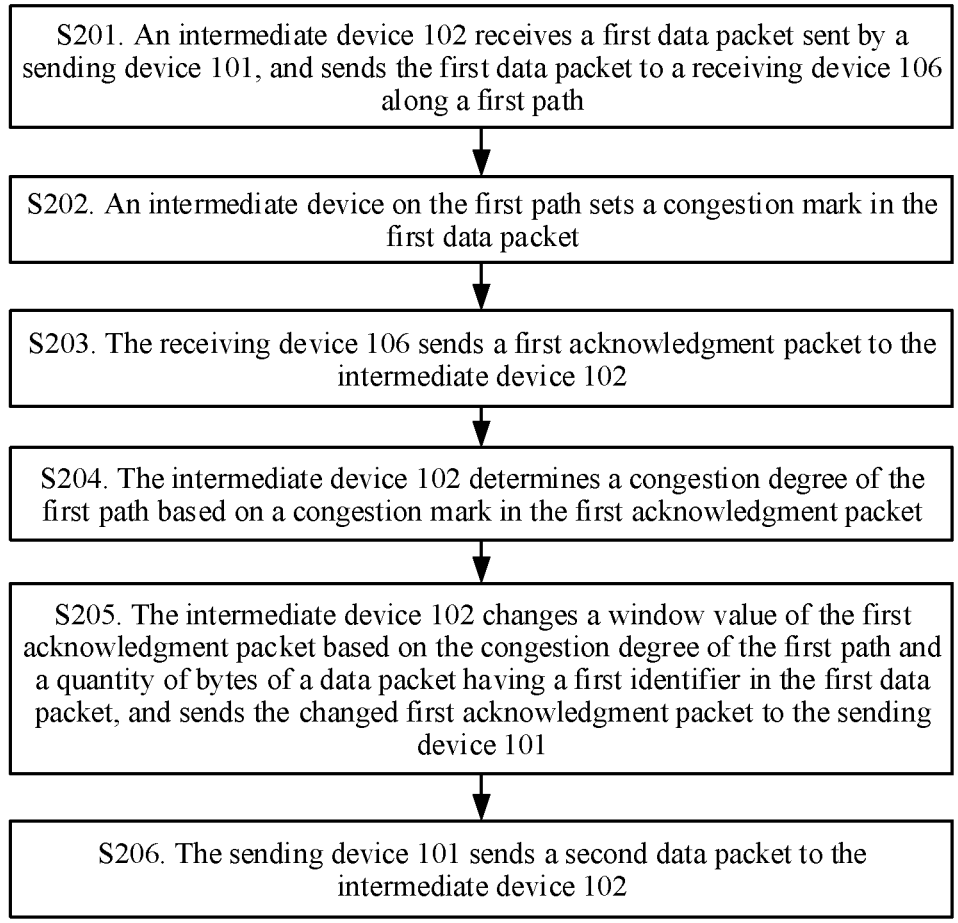
FIG. 2 is a flowchart of a congestion control method according to an embodiment of this application.

FIG. 2 is a flowchart of a congestion control method according to an embodiment of this application. The method may be applied to the network structure shown in FIG. 1. The method includes the following steps.

S201. The intermediate device 102 receives a first data packet sent by the sending device 101, and sends the first data packet to the receiving device 106 along a first path.

The first path may include no intermediate device, or one or more intermediate devices, for example, the intermediate devices 103, 104, and 105 as shown in FIG. 1.

After receiving the first data packet, the intermediate device 102 selects a path for transmitting the first data packet, and adds, to the to-be-sent data packet by using a source routing technology, information about the path through which the to-be-sent data packet is to pass. The information about the path is, for example, IP addresses information of the intermediate devices included on the first path through which the first data packet is to pass. For example, the intermediate device 102 adds, to an option (e.g., option field) of an internet protocol (IP) packet header of the first data packet, IP addresses (for example, IP addresses of the intermediate devices 103, 104, and 105) of intermediate devices through which the first data packet is to pass. In this way, the intermediate devices on the first path may forward the data packet based on the IP addresses in the option field of the IP packet header. For specific implementation of the source routing technology, refer to the Internet Engineering Task Force (IETF) RFC 791 (INTERNET PROTOCOL, DARPA INTERNET PROGRAM PROTOCOL SPECIFICATION), which is incorporated herein by reference in its entirety.

The first data packet may include a plurality of data packets, and the plurality of data packets may have different identifiers. The plurality of data packets may be distinguished by using the identifiers. The identifiers can include, for example, a source IP address, a source port, a destination IP address, and a destination port. The identifiers may further include, for example, a transport layer protocol number (e.g., a transport layer protocol number of TCP is 6). Therefore, the identifiers can constitute a quintuple. After selecting the first path for the first data packet, the intermediate device 102 may record a correspondence between an identifier of each data packet in the first data packet and the first path. For example, the intermediate device 102 records a first identifier (for example, including a source IP address of the sending device 101, a source port on the sending device 101, a destination IP address of the receiving device 106, and a destination port on the receiving device 106) of a data packet having the first identifier in the first data packet, and corresponding information (for example, including the IP addresses of the intermediate devices 103, 104, and 105) about the first path. For example, the intermediate device 102 may further record another identifier (for example, including the source IP address of the sending device 101, another source port on the sending device 101, the destination IP address of the receiving device 106, and another destination port on the receiving device 106) of a data packet having the another identifier in the first data packet, and the corresponding information (for example, including the IP addresses of the intermediate devices 103, 104, and 105) about the first path. The intermediate device 102 may record a correspondence between the first path and an identifier of each data packet sent along the first path. The data packet sent along the first path may further include a data packet that is not sent by the sending device 101 to the receiving device 106 (in other words, a transmit end is not the sending device 101 or a receiving end is not the receiving device 106, but the data packet is sent along the first path—not shown in FIG. 1). Similarly, the intermediate device 102 may further record an identifier of a data packet that is sent to the receiving device 106 along another path and corresponding information about the path. The intermediate device 102 records a correspondence between an identifier of a data packet and a path, and therefore can determine, based on the identifier of the data packet, the path corresponding to the identifier (for example, determine the first path based on the first identifier).

S202. The intermediate device on the first path sets a congestion mark in the first data packet.

When the first data packet passes through the intermediate devices (for example, the intermediate devices 103, 104, and 105) on the first path, each intermediate device on the first path may determine a congestion degree based on a length of a queue that is on the current device and that is used for storing the first data packet. The length of the queue is, for example, a length of to-be-sent data packets cached in a sending cache on each intermediate device. Specifically, two thresholds (for example, t1 and t2, where t1<t2) may be set on the intermediate device. When the length of the queue is less than the threshold t1, the congestion degree is considered as "not congested". When the length of the queue is greater than or equal to the threshold t1 and less than or equal to the threshold t2, the congestion degree is considered as "slight". When the length of the queue is greater than the threshold t2, the congestion degree is considered as "heavy". The intermediate device compares the congestion degree with a congestion degree indicated by the congestion mark in the first data packet. The congestion mark in the first data packet may include a plurality of congestion marks, and each of the plurality of congestion marks is included in one data packet in the first data packet. When the congestion degree on the intermediate device is greater than the congestion degree indicated by the congestion mark in the first data packet, the intermediate device updates the congestion mark in the first data packet by using a congestion mark corresponding to the congestion degree; otherwise, the intermediate device does not update the congestion mark.

In the first data packet, a differentiated services code point (DSCP) field of the IP packet header is used as the congestion mark. For details of the DSCP field of the IP packet header, refer to the IETF RFC 2474 (Definition of the Differentiated Services Field (DS Field) in the IPv4 and IPv6 Headers), which is incorporated herein by reference in its entirety. The DSCP field includes four bits. In a data packet sent from the sending device 101 to the receiving device 106, for example, the first two bits in the four bits may be used as the congestion mark. When the congestion mark is "00," the congestion mark indicates "not congested". When the congestion mark is "01," the congestion mark indicates "slightly congested". When the congestion mark is "10," the congestion mark indicates "heavily congested".

The intermediate device 103 is used as an example. When the intermediate device 103 determines that a congestion degree on the device is "heavily congested", if the congestion mark in the first data packet is "00" or "01," the congestion mark is updated to "10;" or if the congestion mark in the first data packet is "10," the congestion mark is not updated. When the intermediate device 103 determines that a congestion degree on the device is "slightly congested", if the congestion mark in the first data packet is "00," the congestion mark is updated to "01;" or if the congestion mark in the first data packet is "01" or "10," the congestion mark is not updated. When the intermediate device 103 determines that a congestion degree on the device is "not congested", the congestion mark is not updated. By using the foregoing congestion mark update mechanism, a congestion mark in a data packet received by the receiving device 106 may indicate a heaviest congestion degree of the entire path.

Similarly, an intermediate device on another path may also set, in the foregoing manner, a congestion mark in the data packet sent along the other path. In addition, the intermediate device 102 may alternatively determine the congestion degree based on a length of a queue that is on the current intermediate device 102 and that is used for storing the first data packet, and update the congestion mark in the first data packet by using a congestion mark corresponding to the congestion degree.

S203. The receiving device 106 sends a first acknowledgment packet to the intermediate device 102.

After receiving the first data packet, the receiving device 106 obtains the congestion mark in the first data packet, for example, the first two bits of the DSCP field, to generate the first acknowledgment packet. The first acknowledgment packet is used for acknowledging the first data packet, for example, an ACK packet in the TCP. The first acknowledgment packet may include a plurality of acknowledgment packets, each acknowledgment packet is used for acknowledging one data packet in the first data packet, and the plurality of acknowledgment packets may be distinguished by using identifiers. The identifier includes, for example, a source IP address, a source port, a destination IP address, and a destination port. The identifier may further include, for example, a transport layer protocol number (e.g., a transport layer protocol number of TCP is 6). Therefore, the identifier can constitute a quintuple. A correspondence between an identifier of a data packet and an identifier of an acknowledgment packet used for acknowledging the data packet is as follows: A source IP address, a source port, a destination IP address, and a destination port of the identifier of the data packet are respectively the same as a destination IP address, a destination port, a source IP address, and a source port of the identifier of the acknowledgment packet. The identifier of the first data packet and the identifier of the first acknowledgment packet are in the foregoing correspondence. Therefore, the first identifier of the data packet having the first identifier in the first data packet may correspond to a second identifier of an acknowledgment packet having the second identifier in the first acknowledgment packet.

In the first acknowledgment packet, the last two bits of a DSCP field of an IP packet header are used as a congestion mark, and a value of the congestion mark in the first acknowledgment packet sent by the receiving device 106 is the same as a value of the congestion mark in the first data packet received by the receiving device 106.

The first acknowledgment packet may arrive at the intermediate device 102 along a same path (e.g., the first path) used to send the first data packet. Alternatively, the first acknowledgment packet may arrive at the intermediate device 102 along a second path different from the first path. The second path may include no intermediate device, or one or more intermediate devices, for example, the intermediate devices 105, 108, and 107 as shown in FIG. 1.

Similarly, a data packet sent by the intermediate device 102 to the receiving device 106 along another path also corresponds to an acknowledgment packet sent by the receiving device 106 to the intermediate device 102. An identifier of the data packet sent along the other path and an identifier of the corresponding acknowledgment packet are also in the foregoing correspondence. Similarly, for the data packet sent by the intermediate device 102 along the other path, the foregoing manner of setting a congestion mark in the first data packet may also be used for the acknowledgment packet sent by the receiving device 106. The acknowledgment packet can be returned along a same path used for sending the data packet or along a different path.

S204. The intermediate device 102 determines a congestion degree of the first path based on the congestion mark in the first acknowledgment packet.

The intermediate device 102 may determine the first identifier based on the second identifier in the first acknowledgment packet (refer to the correspondence between the first identifier and the second identifier in S203), and further determine information about the first path based on the first identifier (refer to S201, and the intermediate device 102 may record the correspondence between the first identifier and the first path). Further, the intermediate device 102 may calculate the congestion degree based on a quantity or proportion of acknowledgment packets that are in the first acknowledgment packet and in which congestion marks indicate congestion degrees.

For example, the intermediate device 102 calculates a proportion of acknowledgment packets in which congestion marks indicate heavy congestion in a plurality of acknowledgment packets in the first acknowledgment packet. When the proportion is greater than a threshold r2, it is determined that the congestion degree of the first path is "heavily congested"; when the proportion is less than or equal to the threshold r2 and greater than a threshold r1 (r1<r2), it is determined that the congestion degree of the first path is "slightly congested"; or when the proportion is less than the threshold r1, it is determined that the congestion degree of the first path is "not congested". As another example, the intermediate device 102 may alternatively compare, with the threshold r1 and the threshold r2 (r1<r2), a proportion of a sum of a quantity of acknowledgment packets in which congestion marks indicate heavy congestion and a quantity of acknowledgment packets in which congestion marks indicate slight congestion in a plurality of acknowledgment packets in the first acknowledgment packet. When the proportion is greater than the threshold r2, it is determined that the congestion degree of the first path is "heavily congested"; when the proportion is less than or equal to the threshold r2 and greater than the threshold r1 (r1<r2), it is determined that the congestion degree of the first path is "slightly congested"; or when the proportion is less than the threshold r1, it is determined that the congestion degree of the first path is "not congested". For another example, the intermediate device 102 compares, with a threshold n1 and a threshold n2 (n1<n2), a quantity of acknowledgment packets in which congestion marks indicate heavy congestion in a plurality of acknowledgment packets in the first acknowledgment packet. When the quantity is greater than the threshold n2, it is determined that the congestion degree of the first path is "heavily congested"; when the quantity is less than or equal to the threshold n2 and greater than the threshold n1 (n1<n2), it is determined that the congestion degree of the first path is "slightly congested"; or when the quantity is less than the threshold n1, it is determined that the congestion degree of the first path is "not congested".

Similarly, after receiving an acknowledgment packet that is sent by the receiving device 106 and that is used for acknowledging a data packet sent on each path, the intermediate device 102 may determine and record a congestion degree of each path based on a congestion mark in the acknowledgment packet by using the foregoing process. In this way, the intermediate device 102 may record an identifier of a data packet, information about a used path, and a congestion degree of the path.

S205. The intermediate device 102 changes a window value of the first acknowledgment packet based on the congestion degree of the first path and a quantity of bytes of a data packet having a first identifier in the first data packet, and sends the changed first acknowledgment packet to the sending device 101.

In the TCP, the packet header includes a window value field (e.g., to perform traffic control). The receiving device sends an ACK packet to the sending device, and notifies, by using a window value of the ACK packet, the sending device of a quantity of bytes that can be received by the receiving device. The sending device adjusts a sending rate of a data packet based on the window value of the ACK packet. For traffic control in the TCP, refer to the IETF RFC 793 (TRANSMISSION CONTROL PROTOCOL, DARPA INTERNET PROGRAM PROTOCOL SPECIFICATION), which is incorporated herein by reference in its entirety.

The intermediate device 102 changes the window value of the first acknowledgment packet based on the congestion degree of the first path and the quantity of bytes of the data packet having the first identifier in the first data packet. When sending data packets, the intermediate device 102 may count a quantity of bytes of a data packet having each identifier in the data packets, to determine different window values based on the congestion degree of the path and the quantity of bytes of the data packet having each identifier. For example, when sending the first data packet in step S201, the intermediate device 102 may count the quantity of bytes of the data packet having the first identifier in the first data packet. The intermediate device 102 compares the counted quantity of bytes with a specified threshold f1 to determine whether the data packet having the first identifier belongs to an elephant flow (e.g., an extremely large continuous flow) or a mice flow (e.g., a short flow). When a counted quantity of bytes of a data packet having a specific identifier is greater than the threshold f1, the data packet having the specific identifier belongs to the elephant flow; otherwise, the data packet having the specific identifier belongs to the mice flow. For example, the intermediate device 102 counts the quantity of bytes of the data packet having the first identifier in the first data packet. When the quantity of bytes is greater than the threshold f1, the data packet having the first identifier belongs to the elephant flow; or when the quantity of bytes is less than or equal to the threshold f1, the data packet having the first identifier belongs to the mice flow. The intermediate device 102 accumulatively counts the quantity of bytes of the data packet having each identifier, and may obtain an accumulated quantity of bytes based on each identifier. A process of accumulating the quantity of bytes of the data packet having each identifier ends after the intermediate device 102 receives an acknowledgment packet including the identifier and a FIN identifier (refer to the IETF RFC 793). The intermediate device 102 determines a corresponding identifier of a data packet based on the identifier of the acknowledgment packet including the FIN identifier, and clears an accumulated quantity of bytes of the data packet having the corresponding identifier, or deletes a record entry having the corresponding identifier.

The intermediate device 102 may differently adjust sending rates of the elephant flow and the mice flow based on different congestion degrees of the first path, thereby implementing more accurate and effective congestion control. The adjustment is implemented by changing a window value of an acknowledgment packet used for acknowledging a data packet in the elephant flow or the mice flow. For example, the window value may be changed in the following manners:

If the congestion degree of the first path is "slight", and the data packet having the first identifier in the first data packet belongs to the elephant flow (in other words, the quantity of bytes is greater than the threshold f1), a window value of an acknowledgment packet having the second identifier in the first acknowledgment packet is reduced, and the first identifier and the second identifier are in the foregoing correspondence. The acknowledgment packet having the second identifier in the first acknowledgment packet may include a plurality of acknowledgment packets, each acknowledgment packet includes one window value, and the window value of each acknowledgment packet is reduced. A specific window value, for example, a congestion window (cwnd) value, is calculated by using a DCTCP congestion control algorithm. For the calculation, refer to the data center TCP (DCTCP): TCP Congestion Control for Datacenters and draft-ietf-tcpm-dctcp-03 released in the IETF, which is incorporated herein by reference in its entirety. A quantity of mice flows in a data center is apparently greater than that of elephant flows. When a path is slightly congested, the intermediate device 102 preferably reduces the sending rate of the elephant flow, to ensure sending rates of the greater quantity of mice flows, thereby reducing an average flow completion time (FCT).

If the congestion degree of the first path is "heavy", the intermediate device 102 determines whether a second path that is from the intermediate device 102 to the receiving device 106 and whose congestion degree is not "heavy" (the congestion degree is "not congested" or "slightly congested") exists. If the second path does not exist (in other words, there is no switchable path), the intermediate device 102 reduces window values of all acknowledgment packets used for acknowledging data packets sent along the first path. A specific window value, for example, a cwnd value, is calculated by using a DCTCP congestion control algorithm. In this way, sending rates of all the data packets (including the elephant flow and the mice flow) on the first path are reduced.

If there is the second path, the intermediate device 102 enters a path switching state, selects the second path as a new transmission path for the elephant flow, and performs path switching processing on the elephant flow. The intermediate device 102 sets a window value of an acknowledgment packet used for acknowledging a data packet that belongs to the elephant flow in the first data packet to 0, and starts a timer. For example, the data packet having the first identifier in the first data packet belongs to the elephant flow, and the window value of the acknowledgment packet having the second identifier in the first acknowledgment packet is set to 0 (e.g., the acknowledgment packet having the second identifier in the first acknowledgment packet may include a plurality of acknowledgment packets, each acknowledgment packet includes one window value, and the window value of each acknowledgment packet is set to 0). After receiving the acknowledgment packet whose window value is 0, the sending device 101 determines that the quantity of bytes that can be received by the receiving device 106 is 0, and temporarily stops sending the data packet having the first identifier, so that the intermediate device 102 performs path switching processing. The window value of the acknowledgment packet is set to 0, so that the sending device may temporarily stop sending the data packet, to create a path switching occasion. The timer is set, so that there is time for a data packet that is being transmitted on the first path to arrive at the receiving device 106 first, and then the intermediate device 102 sends another data packet having the first identifier (the another data packet having the first identifier may include a plurality of data packets) to the receiving device 106 along the second path. In this way, a possibility of data packet disorder on the receiving device 106 caused by path switching is reduced. If the intermediate device 102 receives, before the timer expires, a second acknowledgment packet sent by the receiving device 106, and the second acknowledgment packet indicates that all data packets (assuming that the data packets belong to the elephant flow) having the first identifier in the first data packet are received by the receiving device 106, the intermediate device 102 directly performs path switching processing. This reduces a waiting time.

The foregoing path switching processing includes: sending the acknowledgment packet having the second identifier to the sending device 101. A window value of the acknowledgment packet is restored to a window value obtained before the intermediate device 102 enters a path switching state (e.g., the acknowledgment packet having the second identifier may include a plurality of acknowledgment packets, each acknowledgment packet includes one window value, and the window value of each acknowledgment packet is restored to the window value obtained before the intermediate device 102 enters the path switching state). After receiving the acknowledgment packet having the second identifier and a restored window value, the sending device 101 re-starts sending another data packet having the first identifier (the another data packet having the first identifier may include a plurality of data packets) to the intermediate device 102, and the intermediate device 102 sends the another data packet having the first identifier to the receiving device 106 along the second path. In this way, the elephant flow is switched to the second path for transmission.

If the intermediate device 102 does not receive, before the timer expires, an acknowledgment packet indicating that all data packets having the first identifier (assuming that the data packets belong to the elephant flow) in the first data packet are received by the receiving device 106, the intermediate device 102 performs path switching processing after the timer expires, and the path switching processing is the same as the path switching processing performed before the timer expires.

S206. The sending device 101 sends a second data packet to the intermediate device 102.

The sending device 101 obtains the window value of the first acknowledgment packet sent by the intermediate device 102, adjusts a sending rate based on the window value, and sends the second data packet to the intermediate device 102. Adjusting the sending rate is, for example, adjusting a transmit window value based on the window value of the first acknowledgment packet. For specific implementation, refer to the IETF RFC 793. In the TCP, the sending device may dynamically adjust a transmit window size based on the window value of the ACK packet returned by the receiving device. In addition, when the path switching processing is performed, for an operation performed by the sending device 101 in a switching processing process, refer to descriptions in S205. After the path switching processing, the intermediate device 102 sends, to the receiving device 106 along the second path, the data packet having the first identifier (assuming that the data packet belongs to the elephant flow) in the data packets that are from the sending device 101. After the path switching processing, the intermediate device 102 may still send, to the receiving device 106 along the first path, a data packet having another identifier in the data packets that are from the sending device 101.

In the foregoing method, the sending device 101 needs to send a data packet only to the intermediate device 102, and adjusts a sending rate (in other words, adjusts a transmit window size) based on a window value of an acknowledgment packet sent by the intermediate device 102. The foregoing processing on the sending device 101 complies with an existing TCP, and no technical change is required. Therefore, this method has better compatibility and convenience.

Figure 3:
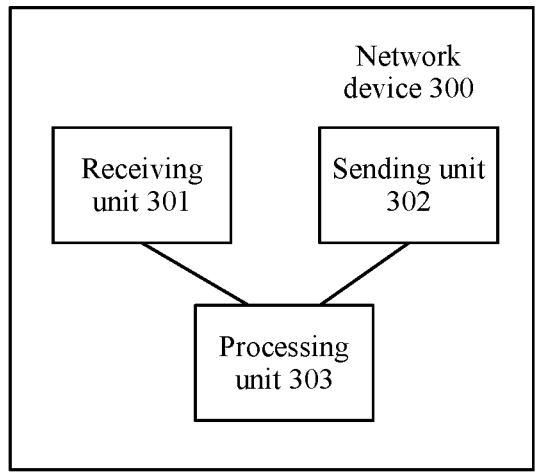
FIG. 3 is a structural diagram of a network device 300 according to an embodiment of this application.

FIG. 3 is a structural diagram of a network device 300 according to an embodiment of this application. The network device 300 may be the intermediate device 102 shown in FIG. 1, and can perform operations performed by the intermediate device 102 in the method shown in FIG. 2. The network device 300 includes a receiving unit 301, a sending unit 302, and a processing unit 303.

The receiving unit 301 is configured to receive a first data packet sent by the sending device 101, and is further configured to receive a first acknowledgment packet that is sent by the receiving device 106 and that is used for acknowledging the first data packet.

The sending unit 302 is configured to send the first data packet to the receiving device 106 along a first path (for example, the first path includes the intermediate devices 103, 104, and 105).

The processing unit 303 is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port (for example, an IP address of the sending device 101, a port on the sending device 101, an IP address of the receiving device 106, and a port on the receiving device 106).

The sending unit 302 is further configured to send the changed first acknowledgment packet to the sending device 101. The window value is used to notify the sending device 101 of a quantity of bytes that can be received by the receiving device 106.

The processing unit 303 may change the window value of the first acknowledgment packet in the following several manners:

If the congestion degree of the first path is "slight", and the quantity of bytes of the data packet having the first identifier in the first data packet is greater than a specified threshold, the processing unit 303 reduces a window value of an acknowledgment packet having a second identifier in the first acknowledgment packet.

The second identifier includes a source IP address, a source port, a destination IP address, and a destination port. The first identifier and the second identifier are in the foregoing correspondence.

If the congestion degree of the first path is "heavy", and there is no slightly congested or non-congested path from the network device 300 to the receiving device 106, the processing unit 303 reduces window values of all acknowledgment packets in the first acknowledgment packet.

If the congestion degree of the first path is "heavy", the quantity of bytes of the data packet having the first identifier in the first data packet is greater than the specified threshold, and there is a slightly congested or non-congested second path from the network device 300 to the receiving device 106, the processing unit 303 sets the window value of the acknowledgment packet having the second identifier in the first acknowledgment packet to 0, and starts a timer.

If the receiving unit 301 receives, before the timer expires, a second acknowledgment packet sent by the receiving device 106, and the second acknowledgment packet indicates that all data packets having the first identifier in the first data packet are received by the receiving device 106, the sending unit 302 sends, to the receiving device 106 along the second path, a data packet having the first identifier in a third data packet received by the receiving unit 301 from the sending device 101.

After the timer expires, the sending unit 302 sends, to the receiving device 106 along the second path, a data packet having the first identifier in a second data packet received by the receiving unit 301 from the sending device 101.

The receiving unit 301 and the sending unit 302 may be integrated into one unit, and the unit completes functions of the receiving unit 301 and the sending unit 302.

Figure 4:
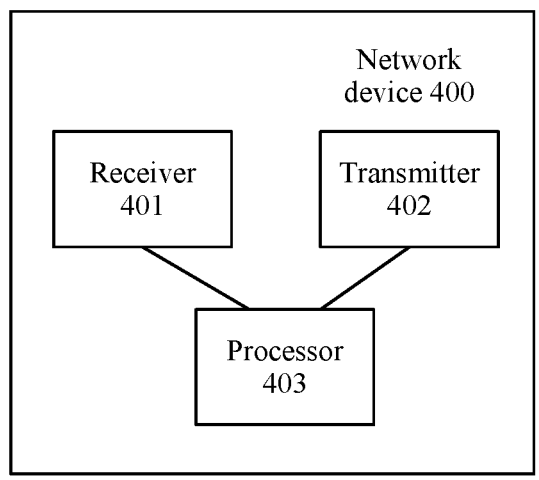
FIG. 4 is a structural diagram of a network device 400 according to an embodiment of this application.

FIG. 4 is a structural diagram of a network device 400 according to an embodiment of this application. The network device 400 may be the intermediate device 102 shown in FIG. 1, and performs operations performed by the intermediate device 102 in the method shown in FIG. 2. The network device 400 includes a receiver 401, a transmitter 402, and a processor 403.

The receiver 401 is configured to receive a first data packet sent by the sending device 101, and is further configured to receive a first acknowledgment packet that is sent by the receiving device 106 and that is used for acknowledging the first data packet.

The transmitter 402 is configured to send the first data packet to the receiving device 106 along a first path (for example, the first path includes the intermediate devices 103, 104, and 105).

The processor 403 is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port (for example, an IP address of the sending device 101, a port on the sending device 101, an IP address of the receiving device 106, and a port on the receiving device 106).

The transmitter 402 is further configured to send the changed first acknowledgment packet to the sending device 101. The window value is used to notify the sending device 101 of a quantity of bytes that can be received by the receiving device 106.

The processor 403 may change the window value of the first acknowledgment packet in the following several manners:

If the congestion degree of the first path is "slight", and the quantity of bytes of the data packet having the first identifier in the first data packet is greater than a specified threshold, the processor 403 reduces a window value of an acknowledgment packet having a second identifier in the first acknowledgment packet. The second identifier includes a source IP address, a source port, a destination IP address, and a destination port. The first identifier and the second identifier are in the foregoing correspondence.

If the congestion degree of the first path is "heavy", and there is no slightly congested or non-congested path from the network device 400 to the receiving device 106, the processor 403 reduces window values of all acknowledgment packets in the first acknowledgment packet.

If the congestion degree of the first path is "heavy", the quantity of bytes of the data packet having the first identifier in the first data packet is greater than the specified threshold, and there is a slightly congested or non-congested second path from the network device 400 to the receiving device 106, the processor 403 sets the window value of the acknowledgment packet having the second identifier in the first acknowledgment packet to 0, and starts a timer.

If the receiver 401 receives, before the timer expires, a second acknowledgment packet sent by the receiving device 106, and the second acknowledgment packet indicates that all data packets having the first identifier in the first data packet are received by the receiving device 106, the transmitter 402 sends, to the receiving device 106 along the second path, a data packet having the first identifier in a third data packet received by the receiver 401 from the sending device 101.

After the timer expires, the transmitter 402 sends, to the receiving device 106 along the second path, a data packet having the first identifier in a second data packet received by the receiver 401 from the sending device 101.

The receiver 401 and the transmitter 402 may communicate with the processor 403 by using a bus, or may be directly connected to the processor 403. The receiver 401 and the transmitter 402 may be integrated into one component, and the component completes functions of the receiver 401 and the transmitter 402. The component is, for example, a network interface. The network interface is, for example, an Ethernet interface, an asynchronous transfer mode (ATM) interface, or a packet over SDH/SONET (POS) interface.

The processor 403 includes, but is not limited to, one or more of a central processing unit (CPU), a network processor (NP), an application-specific integrated circuit (ASIC), or a programmable logic device (PLD). The PLD may be a complex programmable logical device (CPLD), a field-programmable gate array (FPGA), generic array logic (GAL), or any combination thereof.

Figure 5:
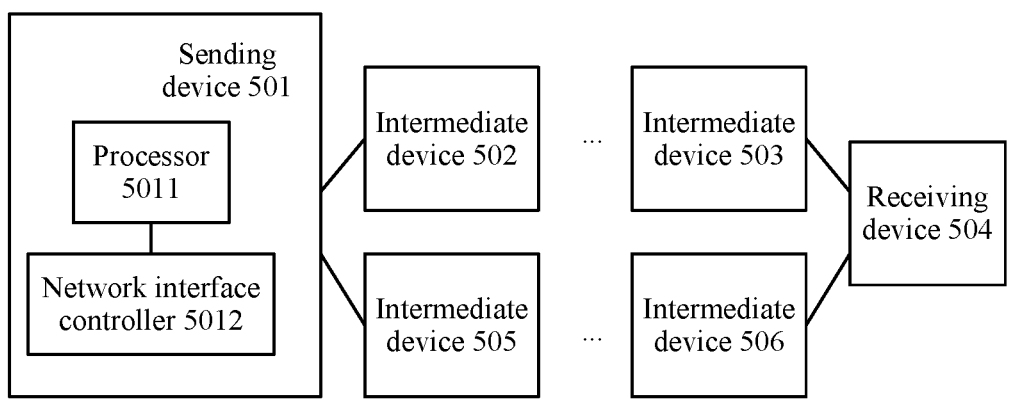
FIG. 5 is a schematic structural diagram of a network according to an embodiment of this application.

FIG. 5 is a schematic structural diagram of a network according to an embodiment of this application. The network includes a sending device 501, at least one intermediate device (for example, intermediate devices 502, 503, 505, and 506 as shown in FIG. 5), and a receiving device 504. The sending device 501 sends a data packet to the receiving device 504 by using at least one intermediate device. The sending device 501 includes a processor 5011 and a NIC 5012. The NIC 5012 may also be referred to as a network adapter, a network interface card, a network card, or the like. The processor 5011 on the sending device 501 may perform a TCP process, and establish a TCP connection to the receiving device 504 by using the NIC 5012.

All data packets sent by the processor 5011 first arrive at the NIC 5012, and then arrive at the receiving device 504 along a first path. The first path may include no intermediate device, or one or more intermediate devices (for example, the intermediate devices 502 and 503 as shown in FIG. 5). An acknowledgment packet (for example, an ACK packet) that is sent by the receiving device 504 and that is used for acknowledging the data packet sent by the sending device 501 may arrive at the NIC 5012 along the first path, and then is sent by the NIC 5012 to the processor 5011. Alternatively, the acknowledgment packet may arrive at the NIC 5012 along a second path different from the first path, and then is sent by the NIC 5012 to the processor 5011. The second path may include no intermediate device, or one or more intermediate devices (for example, the intermediate devices 506 and 505 as shown in FIG. 5). Each acknowledgment packet used for acknowledging the data packet sent by the sending device 501 arrives at the processor 5011 by using the NIC 5012. For example, when a network structure in FIG. 5 is applied to a data center, the sending device 501 may be a host or a server, the receiving device 504 may be a host or a server, and the at least one intermediate device may be a switch, a router, a virtual switch, or the like. Alternatively, the intermediate device 502 and the intermediate device 505 may be TOR switches, and the intermediate device 503 and the intermediate device 506 may also be TOR switches.

Figure 6:
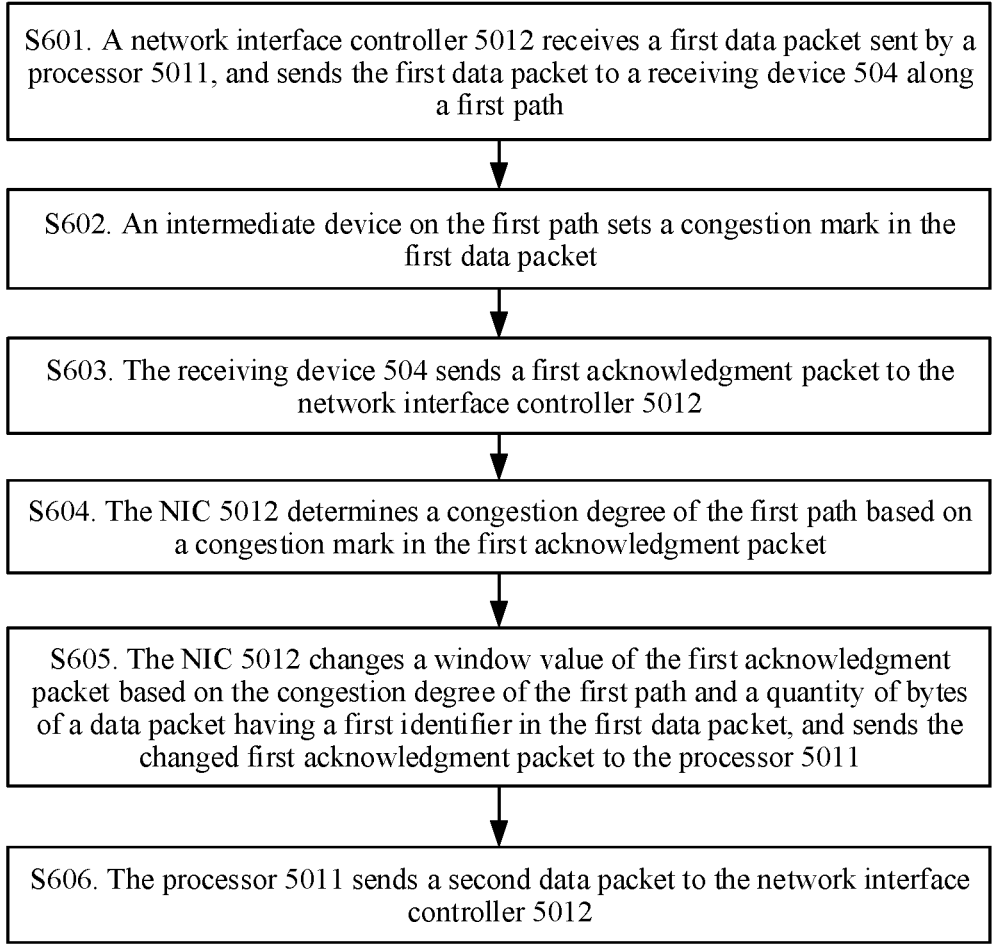
FIG. 6 is a flowchart of a congestion control method according to an embodiment of this application.

FIG. 6 is a flowchart of a congestion control method according to an embodiment of this application. The method may be applied to the network structure shown in FIG. 5. The method includes the following steps.

S601. The network interface controller 5012 receives a first data packet sent by the processor 5011, and sends the first data packet to the receiving device 504 along a first path.

The first path may include no intermediate device, or one or more intermediate devices, for example, the intermediate devices 502 and 503 shown in FIG. 5.

After receiving the first data packet, the NIC 5012 selects a path for transmitting the first data packet, and adds, to the to-be-sent data packet by using a source routing technology, information about the path through which the to-be-sent data packet is to pass. The information about the path is, for example, IP addresses of the intermediate devices included on the first path through which the first data packet is to pass. For example, the NIC 5012 adds, to an option field of an IP packet header of the first data packet, IP addresses (for example, IP addresses of the intermediate devices 502 and 503) of intermediate devices that pass along the first path. In this way, the intermediate devices on the first path may forward the data packet based on the IP addresses in the option field of the IP packet header.

The first data packet may include a plurality of data packets, and the plurality of data packets may have different identifiers. The plurality of data packets may be distinguished by using the identifiers. The identifiers include, for example, a source IP address, a source port, a destination IP address, and a destination port. The identifier may further include, for example, a transport layer protocol number (e.g., a transport layer protocol number of TCP is 6). Therefore, the identifiers can constitute a quintuple. After selecting the first path for the first data packet, the NIC 5012 may record a correspondence between an identifier of each data packet in the first data packet and the first path. For example, the NIC 5012 records a first identifier (for example, including a source IP address of the sending device 501, a source port on the sending device 501, a destination IP address of the receiving device 504, and a destination port on the receiving device 504) of a data packet having the first identifier in the first data packet received from the processor 5011, and corresponding information (for example, including the IP addresses of the intermediate devices 502 and 503) about the first path. For example, the NIC 5012 may further record another identifier (for example, including the source IP address of the sending device 501, another source port on the sending device 501, the destination IP address of the receiving device 504, and another destination port on the receiving device 504) of a data packet having the another identifier in the first data packet, and the corresponding information (for example, including the IP addresses of the intermediate devices 502 and 503) about the first path. The NIC 5012 may record a correspondence between the first path and an identifier of each data packet sent along the first path. The data packets sent along the first path may further include a data packet sent by the sending device 501 to another receiving device other than the receiving device 504 (in other words, a transmit end is not the receiving device 504, but the data packet is sent along the first path—not shown in FIG. 5). Similarly, the NIC 5012 may further record an identifier of a data packet that is sent to the receiving device 504 along another path, and corresponding information about the path. The NIC 5012 records a correspondence between an identifier of a data packet and a path, and therefore can determine, based on the identifier of the data packet, the path corresponding to the identifier (for example, determine the first path based on the first identifier).

S602. The intermediate device on the first path sets a congestion mark in the first data packet.

When the first data packet passes through the intermediate devices (for example, the intermediate devices 502 and 503) on the first path, each intermediate device on the first path may determine a congestion degree based on a length of a queue that is on the current device and that is used for storing the first data packet. The length of the queue is, for example, a length of to-be-sent data packets cached in a sending cache on each intermediate device. For a manner of determining the congestion degree and updating the congestion mark, refer to descriptions in S202.

Similarly, an intermediate device on another path may also set, in the foregoing manner, a congestion mark in the data packet sent along the other path. In addition, the NIC 5012 may alternatively determine the congestion degree based on a length of a queue that is on the current NIC 5012 and that is used for storing the first data packet, and update the congestion mark in the first data packet by using a congestion mark corresponding to the congestion degree.

S603. The receiving device 504 sends a first acknowledgment packet to the network interface controller 5012.

After receiving the first data packet, the receiving device 504 obtains the congestion mark in the first data packet, to generate the first acknowledgment packet. For a generation manner and content of the first acknowledgment packet, refer to descriptions in S203.

The first acknowledgment packet may arrive at the NIC 5012 along a same path (e.g., the first path) used to send the first data packet. Alternatively, the first acknowledgment packet may arrive at the NIC 5012 along a second path different from the first path. The second path may include no intermediate device, or one or more intermediate devices, for example, the intermediate devices 506 and 505 as shown in FIG. 5.

Similarly, a data packet sent by the NIC 5012 to the receiving device 504 along another path also corresponds to an acknowledgment packet sent by the receiving device 504 to the NIC 5012. An identifier of the data packet sent along the other path and an identifier of the corresponding acknowledgment packet are also in the foregoing correspondence described in S203. Similarly, for the data packet sent by the NIC 5012 along the other path, the foregoing manner of setting a congestion mark in the first data packet in S203 may also be used for the acknowledgment packet sent by the receiving device 504. The acknowledgment packet can be returned along a same path used for sending the data packet or along a different path.

S604. The NIC 5012 determines a congestion degree of the first path based on a congestion mark in the first acknowledgment packet.

The NIC 5012 may determine the first identifier based on the second identifier in the first acknowledgment packet, and further determine information about the first path based on the first identifier. Further, the NIC 5012 may calculate the congestion degree based on a quantity or proportion of acknowledgment packets that are in the first acknowledgment packet and in which congestion marks indicate congestion degrees. For a manner of determining the congestion degree of the first path, refer to descriptions in S204.

Similarly, after receiving an acknowledgment packet that is sent by the receiving device 504 and that is used for acknowledging a data packet sent on each path, the NIC 5012 may determine and record a congestion degree of each path based on a congestion mark in the acknowledgment packet by using the foregoing process. In this way, the NIC 5012 may record an identifier of a data packet, information about a used path, and a congestion degree of the path.

S605. The NIC 5012 changes a window value of the first acknowledgment packet based on the congestion degree of the first path and a quantity of bytes of a data packet having a first identifier in the first data packet, and sends the changed first acknowledgment packet to the processor 5011.

The NIC 5012 changes the window value of the first acknowledgment packet based on the congestion degree of the first path and the quantity of bytes of the data packet having the first identifier in the first data packet. When sending data packets, the NIC 5012 may count a quantity of bytes of a data packet having each identifier in the data packets, to determine different window values based on the congestion degree of the path and the quantity of bytes of the data packet having each identifier. For example, when sending the first data packet in step S601, the NIC 5012 counts the quantity of bytes of the data packet having each identifier in the first data packet. The NIC 5012 compares the counted quantity of bytes with a threshold f1 to determine whether the data packet having each identifier belongs to an elephant flow or a mice flow. For a manner in which the NIC 5012 determines whether a data packet belongs to an elephant flow or a mice flow, refer to descriptions in S205.

The NIC 5012 may differently adjust sending rates of the elephant flow and the mice flow based on different congestion degrees of the first path. The adjustment is implemented by changing a window value of an acknowledgment packet used for acknowledging a data packet in the elephant flow or the mice flow. For example, the window value may be changed in the following manners:

If the congestion degree of the first path is "slight", a window value of an acknowledgment packet having the second identifier in the first acknowledgment packet is reduced. For details, refer to descriptions in S205. Details are not described herein again.

If the congestion degree of the first path is "heavy", the NIC 5012 determines whether a second path that is from the NIC 5012 to the receiving device 504 and whose congestion degree is not "heavy" (e.g., the congestion degree is "not congested" or "slightly congested") exists. If the second path does not exist (in other words, there is no switchable path), the NIC 5012 reduces window values of all acknowledgment packets used for acknowledging data packets sent along the first path. A specific window value, for example, a cwnd value, is calculated by using a DCTCP congestion control algorithm.

If the second path exists, the NIC 5012 enters a path switching state, selects the second path as a new transmission path for the elephant flow, and performs path switching processing on the elephant flow. The NIC 5012 sets a window value of an acknowledgment packet used for acknowledging an elephant flow in the first data packet to 0, and starts a timer. For example, the data packet having the first identifier in the first data packet belongs to the elephant flow, and the window value of the acknowledgment packet having the second identifier in the first acknowledgment packet is set to 0 (for details, refer to descriptions in S205). After receiving the acknowledgment packet whose window value is 0, the processor 5011 determines that the quantity of bytes that can be received by the receiving device 504 is 0, and temporarily stops sending the data packet having the first identifier, so that the NIC 5012 performs path switching processing. If the NIC 5012 receives, before the timer expires, a second acknowledgment packet sent by the receiving device 504, and the second acknowledgment packet indicates that all data packets (assuming that the data packets belong to the elephant flow) having the first identifier in the first data packet are received by the receiving device 504, the NIC 5012 directly performs path switching processing.

The foregoing path switching processing includes: sending, by the NIC 5012, the acknowledgment packet having the second identifier to the processor 5011. A window value of the acknowledgment packet is restored to a window value obtained before the NIC 5012 enters a path switching state (for details, refer to descriptions in S205). After receiving the acknowledgment packet having the second identifier and restored window value, the processor 5011 re-starts sending another data packet having the first identifier (the another data packet having the first identifier may include a plurality of data packets) to the NIC 5012, and the NIC 5012 sends the data packet having the first identifier to the receiving device 504 along the second path. In this way, the elephant flow is switched to the second path for transmission.

If the NIC 5012 does not receive, before the timer expires, an acknowledgment packet indicating that all data packets having the first identifier (assuming that the data packets belong to the elephant flow) in the first data packet are received by the receiving device 504, the NIC 5012 performs path switching processing after the timer expires, and the path switching processing is the same as the path switching processing performed before the timer expires.

S606. The processor 5011 sends a second data packet to the network interface controller 5012.

The processor 5011 obtains the window value of the first acknowledgment packet sent by the network interface controller NIC 5012, adjusts a sending rate based on the window value, and sends the second data packet to the NIC 5012. Adjusting the sending rate is, for example, adjusting a transmit window value based on the window value of the first acknowledgment packet. For specific implementation, refer to the IETF RFC 793. In the TCP, the sending device may dynamically adjust a transmit window size based on the window value of the ACK packet returned by the receiving device. In addition, when the path switching processing is performed, for an operation performed by the processor 5011 in a switching processing process, refer to descriptions in S605. After the path switching processing, the NIC 5012 sends, to the receiving device 504 along the second path, the data packet having the first identifier (assuming that the data packet belongs to the elephant flow) in the data packets that are from the processor 5011. After the path switching processing, the NIC 5012 may still send, to the receiving device 504 along the first path, a data packet having another identifier in the data packets that are from the processor 5011.

In the foregoing method, the processor 5011 needs to send a data packet only to the NIC 5012, and adjusts a sending rate (in other words, adjusts a transmit window size) based on a window value of an acknowledgment packet sent by the NIC 5012. The foregoing processing on the processor 5011 complies with an existing TCP, and no technical change is required. The sending device 501 may implement the method by simply adding the network interface controller NIC 5012 having the foregoing functions. Therefore, this method has better compatibility and convenience.

Figure 7:
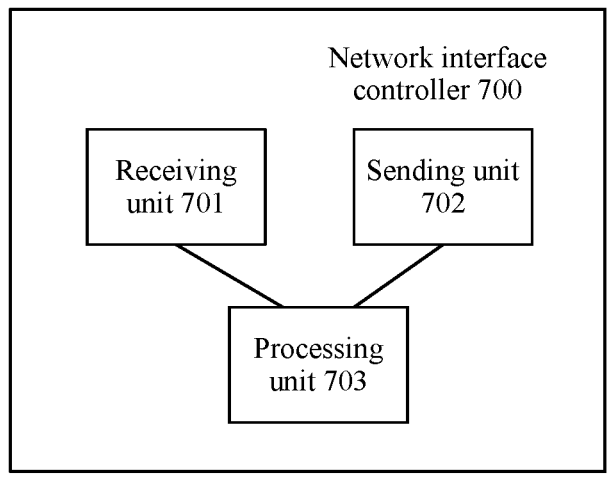
FIG. 7 is a structural diagram of a network interface controller 700 according to an embodiment of this application.

FIG. 7 is a structural diagram of a network interface controller 700 according to an embodiment of this application. The network interface controller 700 (namely, the NIC 700) may be the network interface controller NIC 5012 shown in FIG. 5, and can perform operations performed by the network interface controller NIC 5012 in the method shown in FIG. 6. The network interface controller 700 includes a receiving unit 701, a sending unit 702, and a processing unit 703.

The receiving unit 701 is configured to receive a first data packet sent by the processor 5011, and is further configured to receive a first acknowledgment packet that is sent by the receiving device 504 and that is used for acknowledging the first data packet.

The sending unit 702 is configured to send the first data packet to the receiving device 504 along a first path (for example, the first path includes the intermediate devices 502 and 503).

The processing unit 703 is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port (for example, an IP address of the sending device 501, a port on the sending device 501, an IP address of the receiving device 504, and a port on the receiving device 504).

The sending unit 702 is further configured to send the changed first acknowledgment packet to the processor 5011. The window value is used to notify the processor 5011 of a quantity of bytes that can be received by the receiving device 504.

The processing unit 703 may change the window value of the first acknowledgment packet in the following several manners:

If the congestion degree of the first path is "slight", and the quantity of bytes of the data packet having the first identifier in the first data packet is greater than a specified threshold, the processing unit 703 reduces a window value of an acknowledgment packet having a second identifier in the first acknowledgment packet. The second identifier includes a source IP address, a source port, a destination IP address, and a destination port. The first identifier and the second identifier are in the foregoing correspondence.

If the congestion degree of the first path is "heavy", and there is no slightly congested or non-congested path from the NIC 700 to the receiving device 504, the processing unit 703 reduces window values of all acknowledgment packets in the first acknowledgment packet.

If the congestion degree of the first path is "heavy", the quantity of bytes of the data packet having the first identifier in the first data packet is greater than the specified threshold, and there is a slightly congested or non-congested second path from the NIC 700 to the receiving device 504, the processing unit 703 sets the window value of the acknowledgment packet having the second identifier in the first acknowledgment packet to 0, and starts a timer.

If the receiving unit 701 receives, before the timer expires, a second acknowledgment packet sent by the receiving device 504, and the second acknowledgment packet indicates that all data packets having the first identifier in the first data packet are received by the receiving device 504, the sending unit 702 sends, to the receiving device 504 along the second path, a data packet having the first identifier in a third data packet received by the receiving unit 701 from the processor 5011.

After the timer expires, the sending unit 702 sends, to the receiving device 504 along the second path, a data packet having the first identifier in a second data packet received by the receiving unit 701 from the processor 5011.

The receiving unit 701 and the sending unit 702 may be integrated into one unit, and the unit completes functions of the receiving unit 701 and the sending unit 702.

Figure 8:
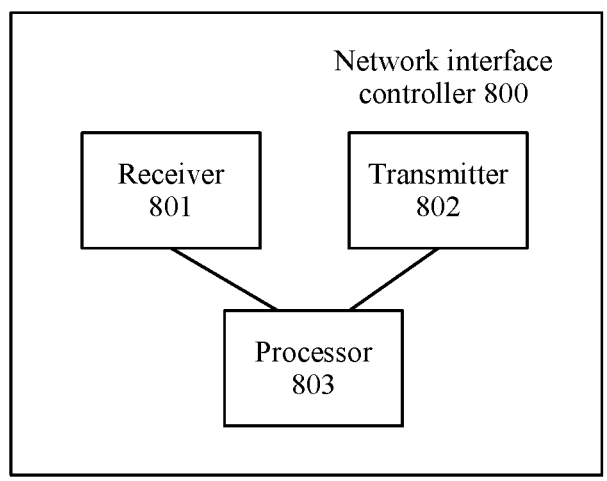
FIG. 8 is a structural diagram of a network interface controller 800 according to an embodiment of this application.

FIG. 8 is a structural diagram of a network interface controller 800 according to an embodiment of this application. The network interface controller 800 (namely, the NIC 800) may be the network interface controller NIC 5012 shown in FIG. 5, and can perform operations performed by the network interface controller NIC 5012 in the method shown in FIG. 6. The network interface controller 800 includes a receiver 801, a transmitter 802, and a processor 803.

The receiver 801 is configured to receive a first data packet sent by the processor 5011, and is further configured to receive a first acknowledgment packet that is sent by the receiving device 504 and that is used for acknowledging the first data packet.

The transmitter 802 is configured to send the first data packet to the receiving device 504 along a first path (for example, the first path includes the intermediate devices 502 and 503).

The processor 803 is configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet. The first identifier includes a source IP address, a source port, a destination IP address, and a destination port (for example, an IP address of the sending device 501, a port on the sending device 501, an IP address of the receiving device 504, and a port on the receiving device 504).

The transmitter 802 is further configured to send the changed first acknowledgment packet to the processor 5011. The window value is used to notify the processor 5011 of a quantity of bytes that can be received by the receiving device 504.

The processor 803 may change the window value of the first acknowledgment packet in the following several manners:

If the congestion degree of the first path is "slight", and the quantity of bytes of the data packet having the first identifier in the first data packet is greater than a specified threshold, the processor 803 reduces a window value of an acknowledgment packet having a second identifier in the first acknowledgment packet. The second identifier includes a source IP address, a source port, a destination IP address, and a destination port. The first identifier and the second identifier are in the foregoing correspondence.

If the congestion degree of the first path is "heavy", and there is no slightly congested or non-congested path from the NIC 800 to the receiving device 504, the processor 803 reduces window values of all acknowledgment packets in the first acknowledgment packet.

If the congestion degree of the first path is "heavy", the quantity of bytes of the data packet having the first identifier in the first data packet is greater than the specified threshold, and there is a slightly congested or non-congested second path from the NIC 800 to the receiving device 504, the processor 803 sets the window value of the acknowledgment packet having the second identifier in the first acknowledgment packet to 0, and starts a timer.

If the receiver 801 receives, before the timer expires, a second acknowledgment packet sent by the receiving device 504, and the second acknowledgment packet indicates that all data packets having the first identifier in the first data packet are received by the receiving device 504, the transmitter 802 sends, to the receiving device 504 along the second path, a data packet having the first identifier in a third data packet received by the receiver 801 from the processor 5011.

After the timer expires, the transmitter 802 sends, to the receiving device 504 along the second path, a data packet having the first identifier in a second data packet received by the receiver 801 from the processor 5011.

The receiver 801 and the transmitter 802 may communicate with the processor 803 by using a bus, or may be directly connected to the processor 803. The bus is, for example, a peripheral component interconnect express (PCI-E) bus. The receiver 801 and the transmitter 802 may be integrated into one component, and the component can complete functions of the receiver 801 and the transmitter 802. The component is, for example, a network interface. The network interface is, for example, an Ethernet interface, an ATM interface, or a POS interface.

The processor 803 includes, but is not limited to, one or more of a CPU, a network processor, an ASIC, or a PLD. The PLD may be a CPLD, an FPGA, a GAL, or any combination thereof.

A person skilled in the art should understand that the embodiments of this application may be provided as a method, an apparatus (device), or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk storage, a CD-ROM, and an optical memory) that include computer usable program code. The computer program is stored/distributed in a proper medium and is provided as or used as a part of the hardware together with other hardware, or may also use another distribution form, for example, by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

The embodiments in this specification are all described in a progressive manner, for same or similar parts in the embodiments, refer to these embodiments, and each embodiment focuses on a difference from other embodiments. Particularly, apparatus and system embodiments are basically similar to a method embodiment, and therefore are described briefly; for related parts, refer to partial descriptions in the method embodiment.

It should be understood that sequence numbers of the foregoing methods do not mean execution sequences in various embodiments of this application. The execution sequences of the methods should be determined according to functions and internal logic of the processes, and should not be construed as any limitation on the implementation processes of the embodiments of this application.

What is claimed is:

1. A congestion control method, applied to a data transmission network, wherein the data transmission network comprises a sending device, at least one intermediate device, and a receiving device, the sending device sends a data packet to the receiving device by using the intermediate device, the method comprising:
   receiving, by a first intermediate device of the at least one intermediate device, a first data packet sent by the sending device, and sending the first data packet to the receiving device along a first path;
   receiving, by the first intermediate device, a first acknowledgment packet that is sent by the receiving device and that is used for acknowledging the first data packet, and determining a congestion degree of the first path based on a congestion mark in the first acknowledgment packet; and
   changing, by the first intermediate device, a window value of the first acknowledgment packet based on the congestion degree of the first path and a quantity of bytes of a data packet having a first identifier in the first data packet, and sending the changed first acknowledgment packet to the sending device, wherein the window value is used to notify the sending device of a quantity of bytes that can be received by the receiving device, and the first identifier comprises a source IP address, a source port, a destination IP address, and a destination port.

2. The method according to claim 1, wherein the changing the window value of the first acknowledgment packet comprises:
   if the congestion degree of the first path is considered as slight, and the quantity of bytes of the data packet having the first identifier in the first data packet is greater than a specified threshold, reducing, by the first intermediate device, a window value of an acknowledgment packet having a second identifier in the first acknowledgment packet, wherein the second identifier comprises a source IP address, a source port, a destination IP address, and a destination port, and the source IP address, the source port, the destination IP address, and the destination port in the first identifier are respectively the same as the destination IP address, the destination port, the source IP address, and the source port in the second identifier.

3. The method according to claim 1, wherein the changing the window value of the first acknowledgment packet comprises:
   if the congestion degree of the first path is considered as heavy, and there is no slightly congested or non-congested path from the first intermediate device to the receiving device, reducing, by the first intermediate device, window values of all acknowledgment packets in the first acknowledgment packet.

4. The method according to claim 1, wherein the changing the window value of the first acknowledgment packet comprises:
   if (a) the congestion degree of the first path is considered as heavy, (b) the quantity of bytes of the data packet having the first identifier in the first data packet is greater than a specified threshold, and (c) there is a slightly congested or non-congested second path from the first intermediate device to the receiving device, setting, by the first intermediate device, the window value of the acknowledgment packet having the second identifier in the first acknowledgment packet to 0, and starting a timer, wherein a second identifier comprises the source IP address, the source port, the destination IP address, and the destination port, and the source IP address, the source port, the destination IP address, and the destination port in the first identifier are respectively the same as the destination IP address, the destination port, the source IP address, and the source port in the second identifier; and
   the method further comprises: after the timer expires, sending, by the first intermediate device to the receiving device along the second path, a data packet having the first identifier in a second data packet received from the sending device.

5. The method according to claim 4, further comprising:
   if the first intermediate device receives, before the timer expires, a second acknowledgment packet sent by the receiving device, and the second acknowledgment packet indicates that all data packets having the first identifier in the first data packet are received by the receiving device, sending, by the first intermediate device to the receiving device along the second path, a data packet having the first identifier in a third data packet received from the sending device.

6. The method according to claim 1, further comprising:
   counting the quantity of bytes of the data packet having the first identifier, wherein the window value of the first acknowledgement packet is changed based on the congestion degree of the first path and the counted quantity of bytes of the data packet having the first identifier.

7. The method according to claim 6, wherein
   when the counted quantity of bytes of the data packet having the first identifier is greater than a threshold, the data packet having the first identifier is determined as belonging to an elephant flow,
   when the counted quantity of bytes of the data packet having the first identifier is smaller than the threshold, the data packet having the first identifier is determined as belonging to a mice flow, and
   the first intermediate device adjusts sending rates of the elephant flow and the mice flow based on different congestion degrees of the first path by changing the window value of the first acknowledgment packet.

8. A congestion control method, applied to a data transmission network, wherein the data transmission network comprises a sending device, at least one intermediate device, and a receiving device, the sending device comprises a processor and a network interface controller (NIC), the sending device sends a data packet to the receiving device by using the at least one intermediate device, the method comprising:
   receiving, by the NIC, a first data packet sent by the processor, and sending the first data packet to the receiving device along a first path;
   receiving, by the NIC, a first acknowledgment packet that is sent by the receiving device and that is used for acknowledging the first data packet, and determining a congestion degree of the first path based on a congestion mark in the first acknowledgment packet; and changing, by the NIC, a window value of the first acknowledgment packet based on the congestion degree of the first path and a quantity of bytes of a data packet having a first identifier in the first data packet, and sending the changed first acknowledgment packet to the processor, wherein the window value is used to notify the processor of a quantity of bytes that can be received by the receiving device, and the first identifier comprises a source IP address, a source port, a destination IP address, and a destination port.

9. The method according to claim 8, wherein the changing the window value of the first acknowledgment packet comprises:
if the congestion degree of the first path is considered as slight, and the quantity of bytes of the data packet having the first identifier in the first data packet is greater than a specified threshold, reducing, by the NIC, a window value of an acknowledgment packet having a second identifier in the first acknowledgment packet, wherein the second identifier comprises a source IP address, a source port, a destination IP address, and a destination port, and the source IP address, the source port, the destination IP address, and the destination port in the first identifier are respectively the same as the destination IP address, the destination port, the source IP address, and the source port in the second identifier.

10. The method according to claim 8, wherein the changing the window value of the first acknowledgment packet comprises:
if the congestion degree of the first path is considered as heavy, and there is no slightly congested or non-congested path from the NIC to the receiving device, reducing, by the NIC, window values of all acknowledgment packets in the first acknowledgment packet.

11. The method according to claim 8, wherein the changing the window value of the first acknowledgment packet comprises:
if (a) the congestion degree of the first path is considered as heavy, (b) the quantity of bytes of the data packet having the first identifier in the first data packet is greater than a specified threshold, and (c) there is a slightly congested or non-congested second path from the NIC to the receiving device, setting, by the NIC, the window value of the acknowledgment packet having the second identifier in the first acknowledgment packet to 0, and starting a timer, wherein the second identifier comprises the source IP address, the source port, the destination IP address, and the destination port, and the source IP address, the source port, the destination IP address, and the destination port in the first identifier are respectively the same as the destination IP address, the destination port, the source IP address, and the source port in the second identifier; and
the method further comprises: after the timer expires, sending, by the NIC to the receiving device along the second path, a data packet having the first identifier in a second data packet received from the processor.

12. The method according to claim 11, further comprising:
if the NIC receives, before the timer expires, a second acknowledgment packet sent by the receiving device, and the second acknowledgment packet indicates that all data packets having the first identifier in the first data packet are received by the receiving device, sending, by the NIC to the receiving device along the second path, a data packet having the first identifier in a third data packet received from the processor.

13. The method according to claim 8, further comprising:
counting the quantity of bytes of the data packet having the first identifier, wherein the window value of the first acknowledgement packet is changed based on the congestion degree of the first path and the counted quantity of bytes of the data packet having the first identifier.

14. A network device, configured to be applied to a data transmission network, wherein the data transmission network comprises a sending device, at least one intermediate device, and a receiving device, the network device is a first intermediate device of the at least one intermediate device, the sending device sends a data packet to the receiving device by using the intermediate device, the network device comprising:
a receiver, configured to receive a first data packet sent by the sending device, and further configured to receive a first acknowledgment packet that is sent by the receiving device and that is used for acknowledging the first data packet;
a transmitter configured to send the first data packet to the receiving device along a first path; and
a processor configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet, wherein the first identifier comprises a source IP address, a source port, a destination IP address, and a destination port, wherein
the transmitter is further configured to send the changed first acknowledgment packet to the sending device, wherein the window value is used to notify the sending device of a quantity of bytes that can be received by the receiving device.

15. The network device according to claim 14, wherein the changing the window value of the first acknowledgment packet comprises:
if the congestion degree of the first path is considered as slight, and the quantity of bytes of the data packet having the first identifier in the first data packet is greater than a specified threshold, reducing, by the processor, a window value of an acknowledgment packet having a second identifier in the first acknowledgment packet, wherein the second identifier comprises a source IP address, a source port, a destination IP address, and a destination port, and the source IP address, the source port, the destination IP address, and the destination port in the first identifier are respectively the same as the destination IP address, the destination port, the source IP address, and the source port in the second identifier.

16. The network device according to claim 14, wherein the changing the window value of the first acknowledgment packet comprises:
if (a) the congestion degree of the first path is considered as heavy, (b) the quantity of bytes of the data packet having the first identifier in the first data packet is greater than a specified threshold, and (c) there is a slightly congested or non-congested second path from the first intermediate device to the receiving device, setting, by the processor, the window value of the acknowledgment packet having the second identifier in the first acknowledgment packet to 0, and starting a timer, wherein a second identifier comprises the source IP address, the source port, the destination IP address, and the destination port, and the source IP address, the source port, the destination IP address, and the destination port in the first identifier are respectively the same as the destination IP address, the destination port, the source IP address, and the source port in the second identifier; and the transmitter is further configured to: after the timer expires, send, to the receiving device along the second path, a data packet having the first identifier in a second data packet received by the receiver from the sending device.

17. The network device according to claim 14, wherein the processor is further configured to:

count the quantity of bytes of the data packet having the first identifier, wherein the window value of the first acknowledgement packet is changed based on the congestion degree of the first path and the counted quantity of bytes of the data packet having the first identifier.

18. A network interface controller (NIC), configured to be applied to a data transmission network, wherein the data transmission network comprises a sending device, at least one intermediate device, and a receiving device, the sending device comprises a first processor and the MC, the sending device sends a data packet to the receiving device by using the intermediate device, the NIC comprising:

a receiver, configured to receive a first data packet sent by the first processor, and further configured to receive a first acknowledgment packet that is sent by the receiving device and that is used for acknowledging the first data packet;

a transmitter configured to send the first data packet to the receiving device along a first path; and a second processor configured to: determine a congestion degree of the first path based on a congestion mark in the first acknowledgment packet, and change a window value of the first acknowledgment packet based on the congestion degree of the first path and a quantity of bytes of a data packet having a first identifier in the first data packet, wherein the first identifier comprises a source IP address, a source port, a destination IP address, and a destination port, wherein the transmitter is further configured to send the changed first acknowledgment packet to the first processor, wherein the window value is used to notify the first processor of a quantity of bytes that can be received by the receiving device.

19. The NIC according to claim 18, wherein the changing the window value of the first acknowledgment packet comprises:

if (a) the congestion degree of the first path is considered as heavy, (b) the quantity of bytes of the data packet having the first identifier in the first data packet is greater than a specified threshold, and (c) there is a slightly congested or non-congested second path from the NIC to the receiving device, setting, by the second processor, the window value of the acknowledgment packet having the second identifier in the first acknowledgment packet to 0, and starting a timer, wherein a second identifier comprises the source IP address, the source port, the destination IP address, and the destination port, and the source IP address, the source port, the destination IP address, and the destination port in the first identifier are respectively the same as the destination IP address, the destination port, the source IP address, and the source port in the second identifier; and the transmitter is further configured to: after the timer expires, send, to the receiving device along the second path, a data packet having the first identifier in a second data packet received by the receiver from the first processor.

20. The NIC according to claim 18, wherein the second processor is further configured to:

count the quantity of bytes of the data packet having the first identifier, wherein the window value of the first acknowledgement packet is changed based on the congestion degree of the first path and the counted quantity of bytes of the data packet having the first identifier.

* * * * *